(12) United States Patent
Inanoglu et al.

(10) Patent No.: US 8,000,382 B2
(45) Date of Patent: Aug. 16, 2011

(54) I/Q IMBALANCE ESTIMATION AND CORRECTION IN A COMMUNICATION SYSTEM

(75) Inventors: Hakan Inanoglu, Acton, MA (US);
Leon Metreaud, Pepperell, MA (US);
Mark S. Wallace, Bedford, MA (US);
Xiangdong Zhang, Westford, MA (US)

(73) Assignee: Qualcomm Incorporated, San Diego, CA (US)

( * ) Notice: Subject to any disclaimer, the term of this patent is extended or adjusted under 35 U.S.C. 154(b) by 895 days.

(21) Appl. No.: 11/969,341

(22) Filed: Jan. 4, 2008

(65) Prior Publication Data

US 2009/0175398 A1    Jul. 9, 2009

(51) Int. Cl.
*H04B 1/38* (2006.01)
*H04L 5/16* (2006.01)
(52) U.S. Cl. ........ 375/221; 375/224; 375/316; 375/324; 375/340
(58) Field of Classification Search .............. 375/221, 375/224, 316, 324, 340
See application file for complete search history.

(56) References Cited

U.S. PATENT DOCUMENTS 7,856,050 B1 * 12/2010 Wiss et al. ............ 375/224
2005/0047494 A1 * 3/2005 Sasson et al. .......... 375/219

OTHER PUBLICATIONS

Declaration of Non-Establishment of International Search Report—PCT/US08/067166, International Searching Authority—European Patent Office, Dec. 11, 2008.
Written Opinion—PCT/US08/067166, International Searching Authority—European Patent Office, Dec. 11, 2008.

* cited by examiner

*Primary Examiner* — Ted M Wang
(74) *Attorney, Agent, or Firm* — Milan I. Patel

(57) ABSTRACT

Certain aspects and embodiments provide for accurate measurement and estimation of imbalances between in-phase (I) and quadrature (Q) components of a complex baseband signal. The accuracy of I/Q phase imbalance estimates may be enhanced by conducting them on a transmitter and a receiver that are connected via a local, loopback connection and by removing cross-spectrum interference in transferred packets. Once these accurate I/Q phase imbalances are determined, they may be used to adjust a signal processed by the transmitter or the receiver to increase the performance and data throughput of communications using the signal.

40 Claims, 5 Drawing Sheets

I/Q IMBALANCE ESTIMATION AND CORRECTION IN A COMMUNICATION SYSTEM

BACKGROUND

1. Field

This application generally relates to signal processing and communication. More specifically, it relates to methods and systems for estimating and/or correcting in-phase (I) and quadrature (Q) communication signal imbalance using signal processing techniques.

2. Background

Wireless communication systems are widely deployed to provide various types of communication content such as voice, data, and so on. These systems may include wireless local area network (WAN) systems exchanging information using various communication techniques. Some of these techniques are focused on methods for transmitting and receiving encoded information. Examples of these techniques include digital modulation techniques such as phase-shift keying (PSK), quadrature amplitude modulation (QAM) and orthogonal frequency division multiplexing (OFDM). Using any of these techniques, a system may encode information into a carrier signal by selectively altering a characteristic of the carrier signal. This information may be decoded by a system receiving the carrier signal with reference to a protocol that defines the meaning ascribed to each carrier signal alteration. Additionally, these modulation techniques may be used in conjunction with various WAN communication standards. For example, OFDM may be used to transmit IEEE 802.11a and IEEE 802.11g packets, as well as in other standards not expressly enumerated herein.

As with any type of communication system, wireless communication systems may suffer from any number of communication inhibitors. More specifically, wireless communications may be inhibited by environmental interference generated by atmospheric conditions and thermal variations. In digital wireless communications, which involve conversion of an analogue signal to a digital signal, quantization error can be a problematic source of interference. OFDM based communications may be further inhibited by phase imbalance between in-phase and quadrature components of the complex baseband signal. These various sources of interference can cause significant signal to noise ratio degradation, resulting in decrease performance and data transfer rates.

There is therefore a need in the art for methods and systems that compensate for the interference caused by these various communication inhibitors.

SUMMARY

Certain aspects and embodiments provide for a method and system that improves wireless communication. For example, one aspect produces accurate estimation and correction of phase imbalance in wireless communication systems.

According to certain aspects and embodiments, a method for estimating phase imbalance for a transmitter and a receiver in a wireless communication system includes establishing a local loopback connection between the transmitter and the receiver, measuring a combined phase imbalance introduced by the transmitter and the receiver, determining a phase imbalance estimate for the transmitter, the phase imbalance estimate for the transmitter indicating the amount of the combined phase imbalance introduced by the transmitter, storing the phase imbalance estimate for the transmitter on a computer readable medium, determining a phase imbalance estimate for the receiver, the phase imbalance estimate indicating the amount of the combined phase imbalance introduced by the receiver, and storing the phase imbalance estimate for the receiver on the computer readable medium. The method can additional include adjusting signals processed by the transmitter using the phase imbalance of the transmitter, and adjusting signals processed by the receiver using the phase imbalance of the receiver.

According to certain aspects and embodiments, an apparatus operable in wireless communication system includes means for establishing a local loopback connection between the transmitter and the receiver, means for measuring a combined phase imbalance introduced by the transmitter and the receiver, means for determining a phase imbalance estimate for the transmitter, the phase imbalance estimate for the transmitter indicating the amount of the combined phase imbalance introduced by the transmitter, means for storing the phase imbalance estimate for the transmitter on a computer readable medium, means for determining a phase imbalance estimate for the receiver, the phase imbalance estimate indicating the amount of the combined phase imbalance introduced by the receiver, and means for storing the phase imbalance estimate for the receiver on the computer readable medium. The apparatus can further include means for adjusting signals processed by the transmitter using the phase imbalance of the transmitter, and means for adjusting signals processed by the receiver using the phase imbalance of the receiver.

According to certain aspects and embodiments, a computer-program product for estimating phase imbalance for a transmitter and a receiver in a wireless communication system comprising a computer readable medium having a set of instructions stored thereon, the set of instructions being executable by one or more processors and the set of instructions including instructions for establishing a local loopback connection between the transmitter and the receiver, instructions for measuring a combined phase imbalance introduced by the transmitter and the receiver, instructions for determining a phase imbalance estimate for the transmitter, the phase imbalance estimate for the transmitter indicating the amount of the combined phase imbalance introduced by the transmitter, instructions for storing the phase imbalance estimate for the transmitter on a computer readable medium, instructions for determining a phase imbalance estimate for the receiver, the phase imbalance estimate indicating the amount of the combined phase imbalance introduced by the receiver, and instructions for storing the phase imbalance estimate for the receiver on the computer readable medium. The computer-program product can further include instructions for adjusting signals processed by the transmitter using the phase imbalance of the transmitter, and instructions for adjusting signals processed by the receiver using the phase imbalance of the receiver.

According to certain aspects and embodiments, an apparatus in a wireless communication system includes a transmitter, a receiver, and a processor coupled to the transmitter and the receiver, having a memory coupled thereto for storing data, and configured to establish a local loopback connection between the transmitter and the receiver, measure a combined phase imbalance introduced by the transmitter and the receiver, determine a phase imbalance estimate for the transmitter, the phase imbalance estimate for the transmitter indicating the amount of the combined phase imbalance introduced by the transmitter, store the phase imbalance estimate for the transmitter, determine a phase imbalance estimate for the receiver, the phase imbalance estimate indicating the amount of the combined phase imbalance introduced by the receiver, and store the phase imbalance estimate for the receiver. The apparatus can further include the processor being configured to adjust signals processed by the transmitter using the phase imbalance of the transmitter, and adjust signals processed by the receiver using the phase imbalance of the receiver.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

DETAILED DESCRIPTION

Figure 1:
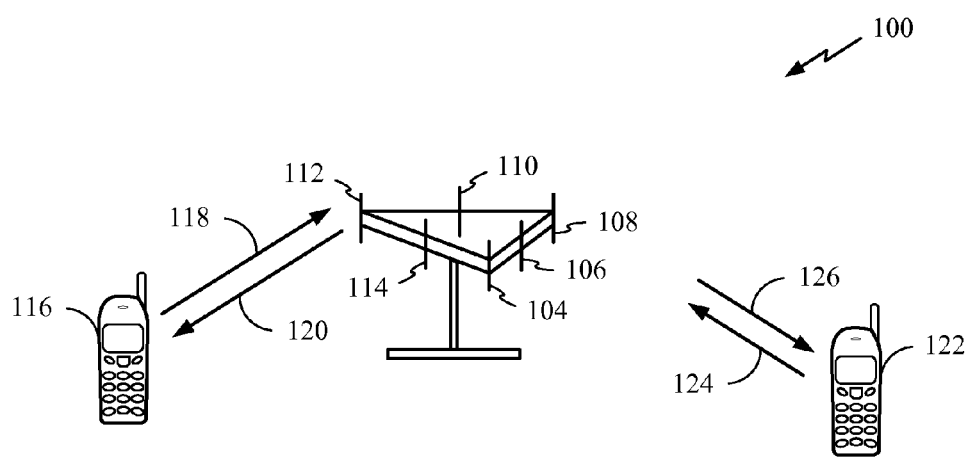
FIG. 1 is an illustration of a wireless multiple-access communication system in accordance with certain aspects and embodiments.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may become evident, however, after learning the teachings herein, that such aspect(s) may be practiced without these specific details. In other instances, well-known structures and devices are shown in block diagram form in order to facilitate describing one or more aspects.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

The applicants have observed that the sources and types of interference that must be addressed to preserve and/or increase communication system performance change as the performance of the communication system changes. For example, thermal noise and quantization error may be the most prominent sources of interference when signal to noise ratio (SNR) is low. Once higher SNR's are achieved, however, other types of interference, such as in-phase (I) and quadrature (Q) phase imbalance, take center stage and so, in some systems, must be corrected to achieve high data rates.

Thus, certain aspects and embodiments provide for accurate measurement and estimation of share imbalances between I and Q components of a transmitted complex baseband signal and the corresponding received I and Q components. Conventionally, communication systems conduct I/Q phase imbalance estimates using the transmitters and receivers that are used in normal communication, i.e. transmitter and receivers on different communications devices. However, although perhaps counterintuitive, the accuracy of I/Q phase imbalance estimates may be enhanced by conducting them on a transmitter and a receiver that are connected via a local, loopback connection. These estimates may be further enhanced by removing cross-spectrum interference in transferred packets. Once these accurate I/Q phase imbalances are determined, they may be used to adjust a signal processed by the transmitter or the receiver to increase the performance and data throughput of communications using the signal.

Referring now to the drawings, FIG. 1 is an illustration of a wireless multiple-access communication system in accordance with various aspects. In one example, an access point 100 (AP) includes multiple antenna groups. As illustrated in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. In another example, an access terminal 116 (AT) can be in communication with antennas 112 and 114, where antennas 112 and 114 transmit information to access terminal 116 over forward link 120 and receive information from access terminal 116 over reverse link 118. Additionally and/or alternatively, access terminal 122 can be in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 can use different frequency for communication. For example, forward link 120 may use a different frequency then that used by reverse link 118.

Each group of antennas and/or the area in which they are designed to communicate can be referred to as a sector of the access point. In accordance with one aspect, antenna groups can be designed to communicate to access terminals in a sector of areas covered by access point 100. In communication over forward links 120 and 126, the transmitting antennas of access point 100 can utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point, e.g., access point 100, can be a fixed station used for communicating with terminals and can also be referred to as a base station, a Node B, an access network, and/or other suitable terminology. In addition, an access terminal, e.g., an access terminal 116 or 122, can be a fixed or mobile station for communicating with access points and can be referred to as a mobile terminal, user equipment (UE), a wireless communication device, a terminal, a wireless terminal and/or other appropriate terminology.

Figure 2:
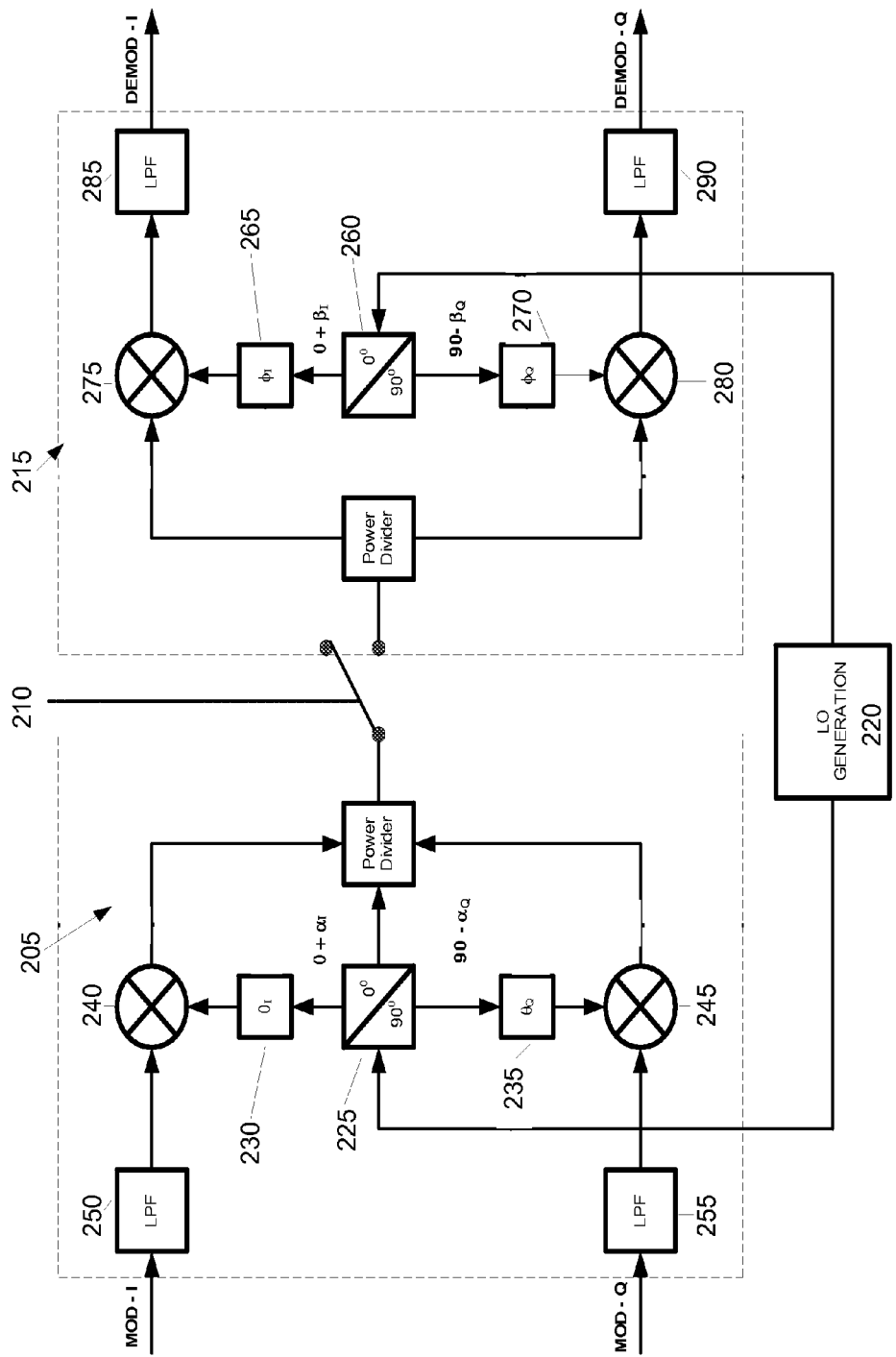
FIG. 2 is an illustration of a block diagram representing a configuration of hardware components in accordance with certain aspects and embodiments.

FIG. 2 is a block diagram a hardware configuration in accord with certain aspects and embodiments. This hardware configuration may be implemented on any suitable hardware platform, such as, for example, an RFIC. As shown, this hardware configuration includes a transmitter 205, a calibration switch control 210, a receiver 215 and a LO generation block 220. The transmitter system 205 includes a signal splitter 225, a modulator I phase shifter 230, a modulator Q phase shifter 235, an I mixer 240, a Q mixer 245, an I low pass filter (LPF) 250 and a Q LPF 255. The receiver system 215 includes a modulator splitter 260, a modulator I phase shifter 265, a modulator Q phase shifter 270, an I mixer 275, a Q mixer 280, an I low pass filter (LPF) 285 and a Q LPF 290.

The calibration switch control 210 may be used to place the RFIC into a calibration mode in which the transmitter 205 and the receiver 215 connected into a local, loopback configuration. In this mode of operation, the transmitter 205 transmits signals directly to the receiver 215, thus minimizing environmental interference sources that mask I/Q phase imbalance when measuring using conventional methods. Because a primary source of I/Q phase imbalance is the hardware of the RFIC itself, measuring I/Q phase imbalance using this environmentally-isolated calibration mode improves accuracy of the measurement.

Various conventional communications components are included in the transmitter 205 and the receiver 215. For instance, the splitters 225 and 260 perform conventional signal splitting functions and are capable of splitting the carrier signal generated by LO generation block 120 into I and Q components. The phase shifters 230, 235, 265 and 270 can receive an input signal, shift or modulate the signal a targeted amount and transmit an output, phase-shifted signal. The mixers 240, 245, 275 and 280 are conventional mixers and can receive input signals and transmit an output signal, which is a mixture of the input signals, at various frequencies. Finally, the LPFs 250, 255, 285 and 290 are conventional low pass filters that are capable of allowing lower frequency signals to pass through the filter while attenuating any higher frequency signals. By producing an accurate estimate of I/Q phase imbalance using the conventional hardware components recited above, certain embodiments may have a cost advantage over conventional hardware configurations that include specialized hardware to cure the performance inhibiting effects of I/Q phase imbalance.

Figure 3:
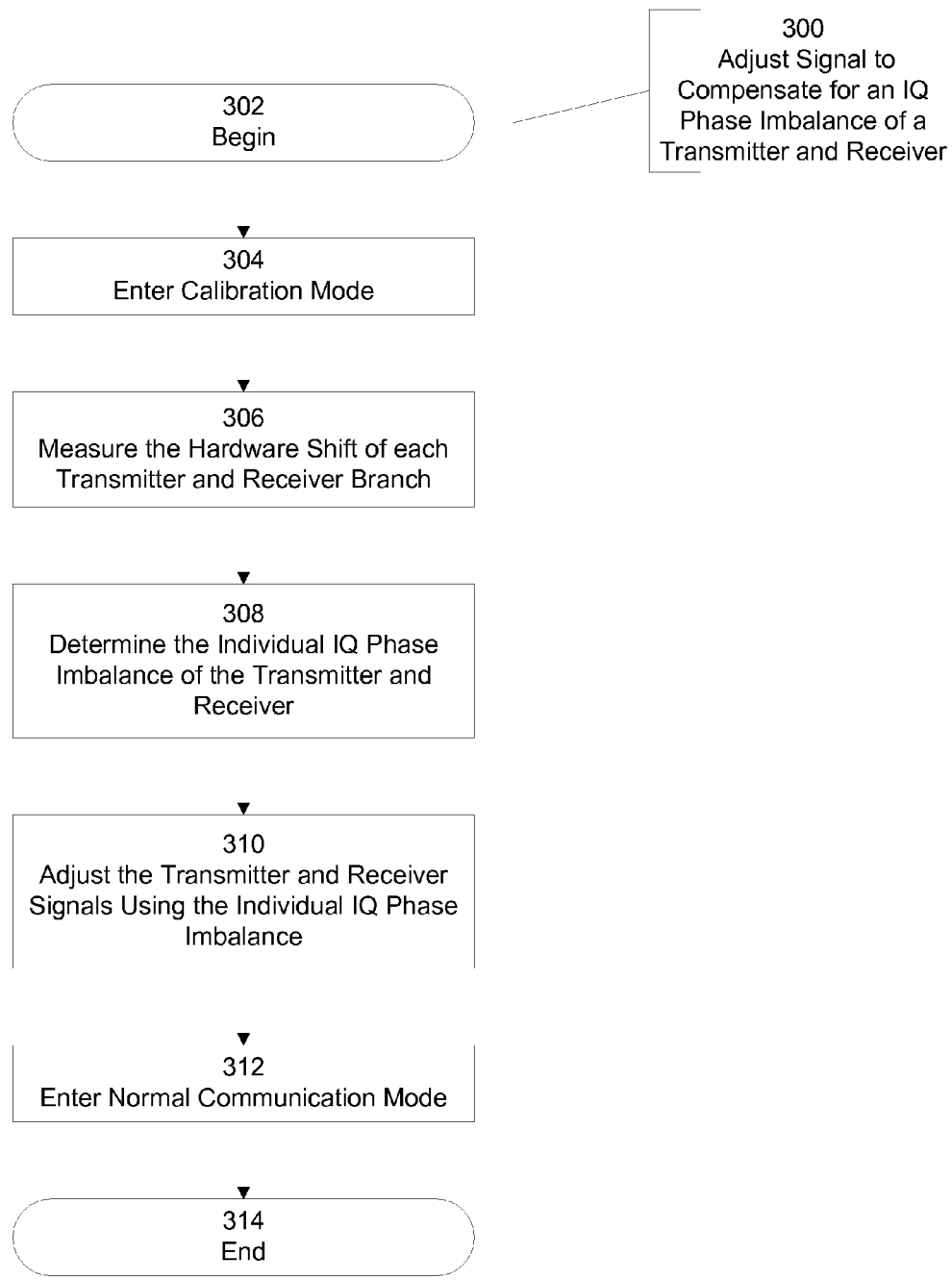
FIGS. 3 and 3A are illustrations of a flow chart and hardware/software block diagram, respectively, of a process for signal processing in accordance with certain aspects and embodiments.

Hardware embodiments described above may be used to practice a method in accord with the certain aspects described herein. This method provides for adjusting a signal processed by a transmitter or a receiver to compensate for the I/Q phase imbalance that either imparts on a complex baseband signal. This method may include establishing a local, loopback connection between the transmitter and the receiver. The method may also include determining the I/Q phase imbalance caused by individual branches within the transmitter and the receiver. As used herein the term "branch" is defined as a combination of transmitter or receiver components used to process either the I or Q components of the complex baseband signal. Next, the method may include aggregating the I/Q phase imbalances caused by the individual branches to determine the I/Q phase imbalance caused by the transmitter and/or the receiver as a whole. Once the I/Q phase imbalance is so determined, beneficial adjustments may be made to the distorted signal. FIG. 3 illustrates such an exemplary method.

At block 302, the method for adjusting a signal to compensate for an I/Q phase imbalance of a transmitter and a receiver begins. At block 304, a system executing this method enters calibration mode. In the exemplary embodiment of FIG. 2, this act is accomplished by engaging the calibration control switch 210. Once calibration mode is established, the transmitter can transmit a signal to the receiver over a local, loopback connection. Calibration mode provides several advantages over other modes of communication including a relatively high SNR, e.g. greater than 32 dB, and a single source for the RF signal that controls frequency conversion in the transmitter 205 and the receiver 215, i.e. the LO generation block 220. Thus, while in calibration mode, there should be no frequency offset between the transmitted and received signals. This facilitates better isolation and identification of communication inhibitors.

At block 306, a system executing method 300 measures the hardware shift for each branch combination of the transmitter and the receiver. In the embodiment illustrated in FIG. 2, the system first configures all of the phase shifters 230, 235, 265 and 270 to zero phase shift and determines the resulting I/Q phase imbalance between the signals output at LPFs 285 and 290. This I/Q phase imbalance is recorded as a baseline I/Q phase imbalance. Next, the system records an I/Q phase imbalance measurement for each transmitter and receiver branch combination, after configuring the phase shifters included in the branch combination to the non-zero phase shift, for example maximum phase shift, and configuring the other phase shifters to zero phase shift. The baseline I/Q phase imbalance is subtracted from each of the branch combination I/Q phase imbalance measurements to determine the hardware shift for each branch combination.

At block 308, a system executing method 300 determines the individual I/Q phase imbalance of the transmitter and the receiver. In the embodiment illustrated in FIG. 2, the system records an output signal measurement for each transmitter and receiver branch combination, after the phase shifters for the branches included in the combination are configured to zero shift. For example, the value of this measurement for the branch combination including phase shifters 230 and 265 is given by equation (1):

$$\hat{x}(t) = 0.5 \tilde{M}_{MIDI} \cos(\alpha_I - \beta_I + \sigma) \quad (1)$$

In equation (1), $M_{MIDI}$ is a complex gain for modulator I branch and the demodulator I branch, $\alpha_I$ is the I/Q phase imbalance introduced by the branch including phase shifter 230, $\beta_I$ is the I/Q phase imbalance introduced by the branch including phase shifter 265 and $\sigma = \sigma_1 - \sigma_2$ is the total phase difference between the signal splitter 225 and the signal splitter 260 (due to different trace length from LO generator to the transmitter 205 and the receiver 215). As equation (1) states, the I/Q phase imbalance between the transmitter and the receiver (modulator and demodulator) I branches are translated into amplitude change on the received signal. A system executing method 300 uses this amplitude change to find the I/Q phase imbalance according to equations (3), (4), (5) and (6) below.

Next the system practicing the method 300 records another output signal measurement for each transmitter and receiver branch combination. For each branch combination measurement, the system records the measurement after configuring the phase shifters for the branches included in the combination to the hardware shift for that branch combination. For example, the value of this measurement for the branch combination including phase shifters 230 and 265 is given by the equation (2):

$$\hat{x}(t) = 0.5 \tilde{M}_{MIDI} \cos(\alpha_I - (\beta_I + \phi_I) + \sigma) \quad (2)$$

In equation (2), $\phi_I$ is the hardware shift of the branch combination including phase shifters 230 and 265. The ratio of the equations (1) and (2) leads to equation (3):

$$\alpha_I - \beta_I + \sigma = \tan^{-1}\left\{\frac{\hat{x}}{\hat{x}\sin(\phi_I)} - \frac{1}{\tan(\phi_I)}\right\} = \Delta_{MIDI} \quad (3)$$

Using equations (3), (4), (5) and (6) the system conducting method 300 records the I/Q phase imbalances for each transmitter and receiver branch combination.

$$\alpha_Q - \beta_I + \sigma = \Delta_{MQDI} \quad (4)$$

$$\alpha_I - \beta_Q + \sigma = \Delta_{MIDQ} \quad (5)$$

$$\alpha_Q - \beta_Q + \sigma = \Delta_{MQDQ} \quad (6)$$

Using equations (7) and (8), the system performing method 300 records the I/Q phase imbalances for the transmitter and the receiver. As can been seen with regard to FIG. 1, equation (7) applies to the transmitter and equation (8) applies to the receiver.

$$\alpha_I - \alpha_Q = \Delta_{MIDI} - \Delta_{MQDI} \quad (7)$$

$$\beta_I - \beta_Q = \Delta_{MQDQ} - \Delta_{MQDI} \quad (8)$$

The accuracy of the I/Q phase imbalance estimate may be further increased by setting half of the tones in the OFDM data symbols to zero to decrease interference to the half that are used to measure the combined I/Q phase imbalance. Using these techniques in combination with a loopback configuration can enable a system executing method 300 to accurately estimate I/Q phase imbalances by transmitting a single 802.11a or 802.11g packet, as well as other standards not expressly enumerated herein.

Figure 4:
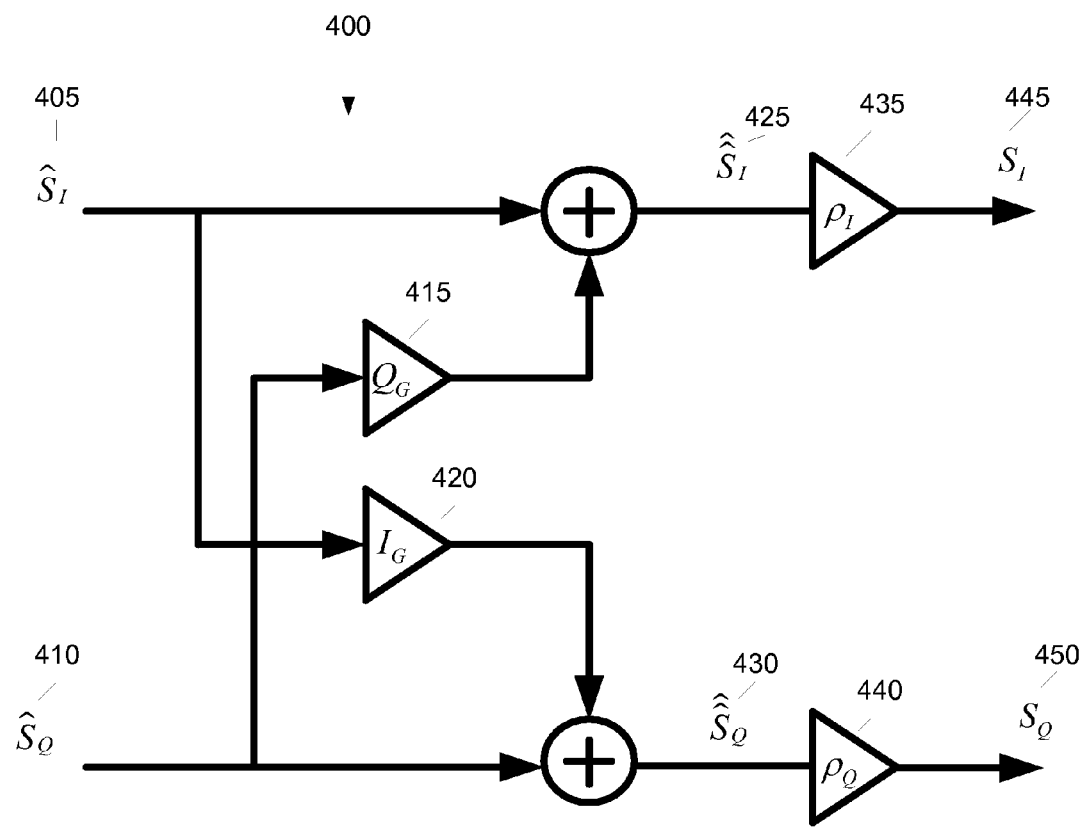
FIG. 4 is an illustration of a block diagram representing a configuration of hardware and/or software components in accordance with certain aspects and embodiments.

At block 310, a system executing method 300 adjusts signals processed by the transmitter or receiver using the individual I/Q phase imbalance ratios to compensate for the I/Q phase imbalance. FIG. 4 illustrates, in the form of a block diagram, a signal correction circuit 400 in accord with a certain aspects and embodiments. The signal correction circuit 400 mixes distorted I signal 405 with distorted Q signal 410 magnified by gain 415 $Q_G$ to yield intermediate I signal 425. Similarly, the signal correction circuit 400 mixes distorted Q signal 410 with distorted I signal 405 magnified by gain 420 $I_G$ to yield intermediate Q signal. The gain 415 $Q_G$ and the gain 420 $I_G$ are defined in term of complex a and b by equations (9) and (10):

$$I_G = -\frac{a_i + b_i}{a_r + b_r} \quad (9)$$

$$Q_G = -\frac{b_i - a_i}{a_r - b_r} \quad (10)$$

The signal correction circuit 300 next magnifies the intermediate signals 425 and 430 by gains 435 and 440, respectively, producing undistorted signals 445 and 450. The gains 435 and 440 are defined, respectively, in terms of complex a and b by equations (11) and (12):

$$\rho_I = \left[\frac{a_r^2 - b_r^2 + a_i^2 - b_i^2}{a_r - b_r}\right]^{-1} \quad (11)$$

$$\rho_Q = \left[\frac{a_r^2 - b_r^2 + a_i^2 - b_i^2}{a_r + b_r}\right]^{-1} \quad (12)$$

Finally complex constants a and b are defined in equations (13) and (14)

$$a = \frac{g_I + g_Q}{2}\cos\left(\frac{\Delta\varphi}{2}\right) + j\frac{g_I - g_Q}{2}\sin\left(\frac{\Delta\varphi}{2}\right) \quad (13)$$

$$b = \frac{g_I - g_Q}{2}\cos\left(\frac{\Delta\varphi}{2}\right) - j\frac{g_I + g_Q}{2}\sin\left(\frac{\Delta\varphi}{2}\right) \quad (14)$$

In equations (13) and (14), $g_I$ and $g_Q$ are the amplitude imbalance in I and Q signals and $\Delta\phi$ is I/Q phase imbalance.

At block 312, a system executing method 300 enters normal communication mode. In the exemplary embodiment of FIG. 2, this act is accomplished by disengaging the calibration control switch 210. Once normal communication mode is established, the transmitter can transmit a signal to a remote receiver over a wireless connection. The output signal of the transmitter may be adjusted according the I/Q phase imbalance adjustment determined while the transmitter was in calibration mode. Likewise, the receiver can receive a signal from a remote transmitter over a wireless connection and adjust it appropriate before decoding the symbols it contains.

At block 314, method 300 ends.

Figure 3A:
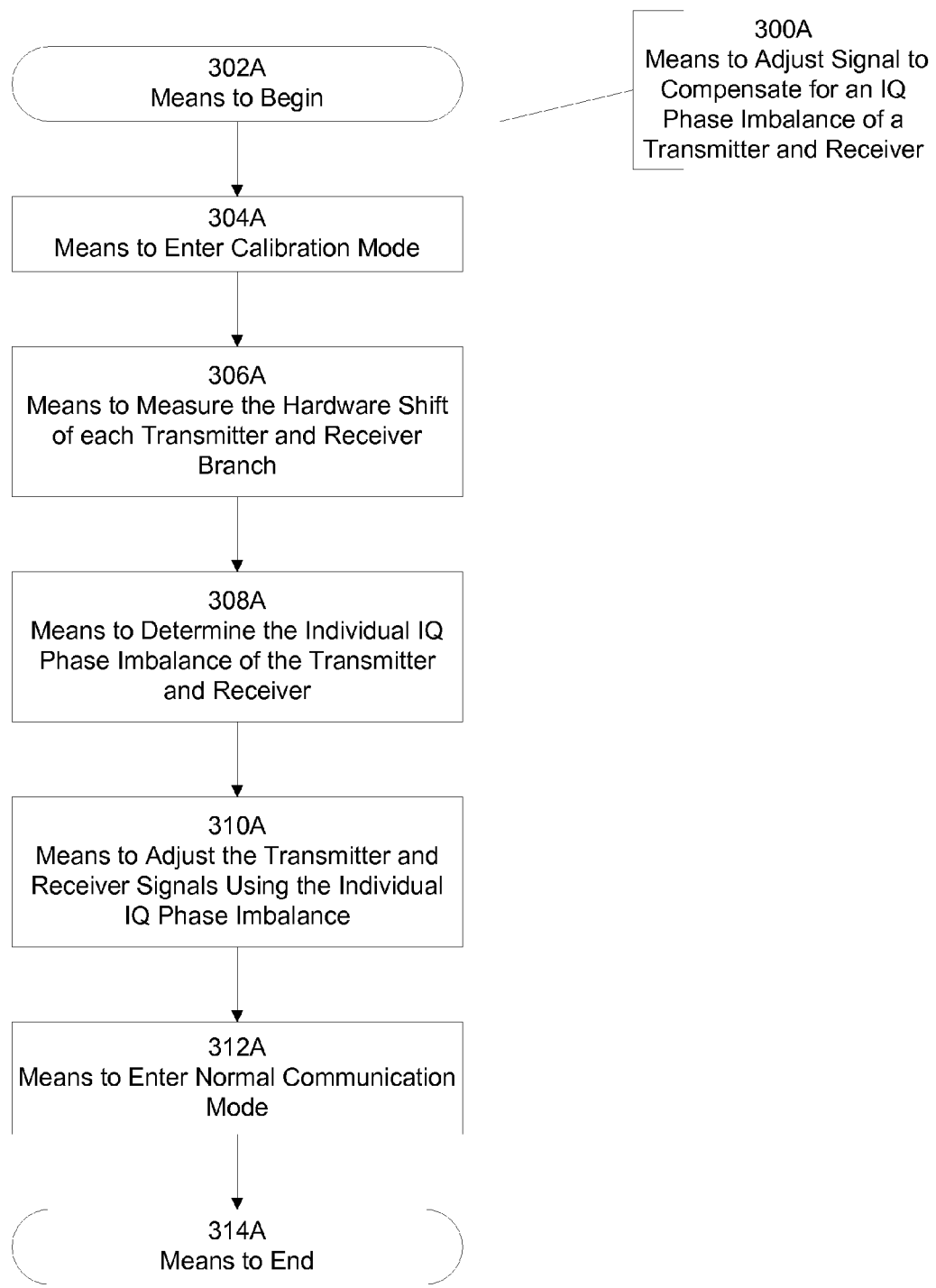

The method 300 of FIG. 3 described above may be performed by various hardware and/or software component(s) and/or module(s) corresponding to the means-plus-function blocks 300A-314A illustrated in FIG. 3A. In other words, blocks 300 through 314 illustrated in FIG. 3 correspond to means-plus-function blocks 300A through 314A illustrated in FIG. 3A.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the application.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the scope of the application. Thus, the present application is to be accorded the widest scope consistent with the claims as understood in light of the principles and features disclosed herein.

What is claimed is:

1. A method for estimating phase imbalance for a transmitter and a receiver in a wireless communication system, the method comprising:
   establishing a local loopback connection between the transmitter and the receiver;
   measuring a combined phase imbalance introduced by the transmitter and the receiver, wherein measuring the combined phase imbalance comprises measuring a phase imbalance using symbols including tones restricted to a subset of an available spectrum;
   determining a phase imbalance estimate for the transmitter, the phase imbalance estimate for the transmitter indicating the amount of the combined phase imbalance introduced by the transmitter;
   storing the phase imbalance estimate for the transmitter on a computer readable medium;
   determining a phase imbalance estimate for the receiver, the phase imbalance estimate indicating the amount of the combined phase imbalance introduced by the receiver; and
   storing the phase imbalance estimate for the receiver on the computer readable medium.

2. The method according to claim 1, wherein establishing a local loopback connection comprises establishing a local loopback connection between a plurality of transmitter branches and a plurality of receiver branches.

3. The method according to claim 2, wherein establishing the local loopback connection between the plurality of transmitter branches and the plurality of receiver branches comprises establishing a local loopback connection between an in-phase (I) transmitter branch, a quadrature (Q) transmitter branch, an I receiver branch and a Q receiver branch.

4. The method according to claim 1, wherein measuring the combined phase imbalance further comprises measuring an in-phase (I)/quadrature (Q) phase imbalance.

5. The method according to claim 1, wherein measuring the combined phase imbalance further comprises measuring a phase imbalance introduced by a combination of a transmitter branch and a receiver branch.

6. The method according to claim 1, wherein measuring the combined phase imbalance further comprises measuring a phase imbalance introduced by the transmitter and the receiver, the transmitter and the receiver being configured to a zero target phase shift.

7. The method according to claim 1, wherein determining the phase imbalance estimate for the transmitter comprises:
determining a plurality of hardware shifts, each hardware shift of the plurality of hardware shifts introduced by a corresponding combination of a transmitter branch and a receiver branch;
determining, using the plurality of hardware shifts, a plurality of ratios, each ratio of the plurality of ratios indicating an amount of phase imbalance introduced by a combination of a transmitter branch and a receiver branch; and
determining the phase imbalance estimate using the plurality of ratios.

8. The method according to claim 7, wherein determining the plurality of hardware shifts comprises comparing, for each hardware shift of the plurality of hardware shifts, a first phase shift to a second phase shift, the first phase shift introduced by a combination of a transmitter branch and a receiver branch, the transmitter and the receiver being configured to a zero target phase shift, the second phase shift introduced by the combination of the transmitter branch and the receiver branch, the transmitter and the receiver being configured to a non-zero target phase shift.

9. The method according to claim 8, wherein comparing comprises subtracting the first phase shift from the second phase shift.

10. The method according to claim 7 wherein determining, using the plurality of hardware shifts, the plurality of ratios comprises comparing, for each ratio of the plurality of ratios, a first signal to a second signal, the first signal being output from a combination of a transmitter branch and a receiver branch, the transmitter and the receiver being configured to a zero target phase shift, the second signal being output from the combination of the transmitter branch and the receiver branch, the transmitter and the receiver being configured to a target phase shift equal to the hardware shift corresponding to the combination of the transmitter branch and the receiver branch.

11. The method according to claim 10, wherein comparing comprises dividing the second signal by the first signal.

12. The method according to claim 7, wherein determining the phase imbalance estimate comprises comparing a first ratio of the plurality of ratios from a second ratio from the plurality of ratios.

13. The method according to claim 12, wherein comparing comprises subtracting a first ratio of the plurality of ratios from a second ratio from the plurality of ratios.

14. The method according to claim 1, wherein determining the phase imbalance estimate for the receiver comprises:
determining a plurality of hardware shifts, each hardware shift of the plurality of hardware shifts introduced by a corresponding combination of a transmitter branch and a receiver branch;
determining, using the plurality of hardware shifts, a plurality of ratios, each ratio of the plurality of ratios indicating an amount of phase imbalance introduced by a combination of a transmitter branch and a receiver branch; and
determining the phase imbalance estimate using the plurality of ratios.

15. The method according to claim 14, wherein determining the plurality of hardware shifts comprises comparing, for each hardware shift of the plurality of hardware shifts, a first phase shift to a second phase shift, the first phase shift introduced by a combination of a transmitter branch and a receiver branch, the transmitter and the receiver being configured to a zero target phase shift, the second phase shift introduced by the combination of the transmitter branch and the receiver branch, the transmitter and the receiver being configured to a non-zero target phase shift.

16. The method according to claim 15, wherein comparing comprises subtracting the first phase shift from the second phase shift.

17. The method according to claim 14 wherein determining, using the plurality of hardware shifts, the plurality of ratios comprises comparing, for each ratio of the plurality of ratios, a first signal to a second signal, the first signal being output from a combination of a transmitter branch and a receiver branch, the transmitter and the receiver being configured to a zero target phase shift, the second signal being output from the combination of the transmitter branch and the receiver branch, the transmitter and the receiver being configured to a target phase shift equal to the hardware shift corresponding to the combination of the transmitter branch and the receiver branch.

18. The method according to claim 17, wherein comparing comprises dividing the second signal by the first signal.

19. The method according to claim 14, wherein determining the phase imbalance estimate comprises comparing a first ratio of the plurality of ratios from a second ratio from the plurality of ratios.

20. The method according to claim 19, wherein comparing comprises subtracting a first ratio of the plurality of ratios from a second ratio from the plurality of ratios.

21. The method according to claim 1, further comprising:
adjusting signals processed by the transmitter using the phase imbalance of the transmitter; and
adjusting signals processed by the receiver using the phase imbalance of the receiver.

22. An electronic device configured to execute the method of claim 1.

23. An apparatus operable in wireless communication system, the apparatus comprising:
means for establishing a local loopback connection between the transmitter and the receiver;
means for measuring a combined phase imbalance introduced by the transmitter and the receiver, wherein the means for measuring the combined phase imbalance comprises means for measuring a phase imbalance using symbols including tones restricted to a subset of an available spectrum;
means for determining a phase imbalance estimate for the transmitter, the phase imbalance estimate for the transmitter indicating the amount of the combined phase imbalance introduced by the transmitter;

means for storing the phase imbalance estimate for the transmitter on a computer readable medium;

means for determining a phase imbalance estimate for the receiver, the phase imbalance estimate indicating the amount of the combined phase imbalance introduced by the receiver; and means for storing the phase imbalance estimate for the receiver on the computer readable medium.

24. The apparatus according to claim 23, wherein the means for establishing a local loopback connection comprises means for establishing a local loopback connection between a plurality of transmitter branches and a plurality of receiver branches.

25. The apparatus according to claim 23, wherein the means for measuring the combined phase imbalance further comprises means for measuring a phase imbalance introduced by the transmitter and the receiver, the transmitter and the receiver being configured to a zero target phase shift.

26. The apparatus according to claim 23, wherein the means for determining the phase imbalance estimate for the transmitter comprises:
  means for determining a plurality of hardware shifts, each hardware shift of the plurality of hardware shifts introduced by a corresponding combination of a transmitter branch and a receiver branch;
  means for determining, using the plurality of hardware shifts, a plurality of ratios, each ratio of the plurality of ratios indicating an amount of phase imbalance introduced by a combination of a transmitter branch and a receiver branch; and
  means for determining the phase imbalance estimate using the plurality of ratios.

27. The apparatus according to claim 23, wherein the means for determining the phase imbalance estimate for the receiver comprises:
  means for determining a plurality of hardware shifts, each hardware shift of the plurality of hardware shifts introduced by a corresponding combination of a transmitter branch and a receiver branch;
  means for determining, using the plurality of hardware shifts, a plurality of ratios, each ratio of the plurality of ratios indicating an amount of phase imbalance introduced by a combination of a transmitter branch and a receiver branch; and
  means for determining the phase imbalance estimate using the plurality of ratios.

28. The apparatus according to claim 23, further comprising:
  means for adjusting signals processed by the transmitter using the phase imbalance of the transmitter; and
  means for adjusting signals processed by the receiver using the phase imbalance of the receiver.

29. A computer-program product for estimating phase imbalance for a transmitter and a receiver in a wireless communication system comprising a computer readable medium having a set of instructions stored thereon, the set of instructions being executable by one or more processors and the set of instructions comprising:
  instructions for establishing a local loopback connection between the transmitter and the receiver;
  instructions for measuring a combined phase imbalance introduced by the transmitter and the receiver, wherein the instructions for measuring the combined phase imbalance comprises instructions for measuring a phase imbalance using symbols including tones restricted to a subset of an available spectrum;
  instructions for determining a phase imbalance estimate for the transmitter, the phase imbalance estimate for the transmitter indicating the amount of the combined phase imbalance introduced by the transmitter;
  instructions for storing the phase imbalance estimate for the transmitter on a computer readable medium;
  instructions for determining a phase imbalance estimate for the receiver, the phase imbalance estimate indicating the amount of the combined phase imbalance introduced by the receiver; and
  instructions for storing the phase imbalance estimate for the receiver on the computer readable medium.

30. The computer-program product according to claim 29, wherein the instructions for establishing a local loopback connection comprises instructions for establishing a local loopback connection between a plurality of transmitter branches and a plurality of receiver branches.

31. The computer-program product according to claim 29, wherein the instructions for measuring the combined phase imbalance further comprises instructions for measuring a phase imbalance introduced by the transmitter and the receiver, the transmitter and the receiver being configured to a zero target phase shift.

32. The computer-program product according to claim 29, wherein the instructions for determining the phase imbalance estimate for the transmitter comprises:
  instructions for determining a plurality of hardware shifts, each hardware shift of the plurality of hardware shifts introduced by a corresponding combination of a transmitter branch and a receiver branch;
  instructions for determining, using the plurality of hardware shifts, a plurality of ratios, each ratio of the plurality of ratios indicating an amount of phase imbalance introduced by a combination of a transmitter branch and a receiver branch; and
  instructions for determining the phase imbalance estimate using the plurality of ratios.

33. The computer-program product according to claim 29, wherein the instructions for determining the phase imbalance estimate for the receiver comprises:
  instructions for determining a plurality of hardware shifts, each hardware shift of the plurality of hardware shifts introduced by a corresponding combination of a transmitter branch and a receiver branch;
  instructions for determining, using the plurality of hardware shifts, a plurality of ratios, each ratio of the plurality of ratios indicating an amount of phase imbalance introduced by a combination of a transmitter branch and a receiver branch; and
  instructions for determining the phase imbalance estimate using the plurality of ratios.

34. The computer-program product according to claim 29, further comprising:
  instructions for adjusting signals processed by the transmitter using the phase imbalance of the transmitter; and
  instructions for adjusting signals processed by the receiver using the phase imbalance of the receiver.

35. An apparatus in a wireless communication system, the apparatus comprising:
  a transmitter;
  a receiver; and
  a processor coupled to the transmitter and the receiver, having a memory coupled thereto for storing data, and configured to:
    establish a local loopback connection between the transmitter and the receiver;

measure a combined phase imbalance introduced by the transmitter and the receiver using symbols including tones restricted to a subset of an available spectrum;

determine a phase imbalance estimate for the transmitter, the phase imbalance estimate for the transmitter indicating the amount of the combined phase imbalance introduced by the transmitter;

store the phase imbalance estimate for the transmitter;

determine a phase imbalance estimate for the receiver, the phase imbalance estimate indicating the amount of the combined phase imbalance introduced by the receiver; and store the phase imbalance estimate for the receiver.

36. The apparatus according to claim 35, wherein the processor being configured to establish a local loopback connection comprises the processor being configured to establish a local loopback connection between a plurality of transmitter branches and a plurality of receiver branches.

37. The apparatus according to claim 35, wherein the processor being configured to measure the combined phase imbalance comprises the processor being configured to measure a phase imbalance introduced by the transmitter and the receiver, the transmitter and the receiver being configured to a zero target phase shift.

38. The apparatus according to claim 35, wherein the processor being configured to determine the phase imbalance estimate for the transmitter comprises the processor being configured to:

determine a plurality of hardware shifts, each hardware shift of the plurality of hardware shifts introduced by a corresponding combination of a transmitter branch and a receiver branch;

determine, using the plurality of hardware shifts, a plurality of ratios, each ratio of the plurality of ratios indicating an amount of phase imbalance introduced by a combination of a transmitter branch and a receiver branch; and determine the phase imbalance estimate using the plurality of ratios.

39. The apparatus according to claim 35, wherein the processor being configured to determine the phase imbalance estimate for the receiver comprises the processor being configured to:

determine a plurality of hardware shifts, each hardware shift of the plurality of hardware shifts introduced by a corresponding combination of a transmitter branch and a receiver branch;

determine, using the plurality of hardware shifts, a plurality of ratios, each ratio of the plurality of ratios indicating an amount of phase imbalance introduced by a combination of a transmitter branch and a receiver branch; and determine the phase imbalance estimate using the plurality of ratios.

40. The apparatus according to claim 35, further comprising the processor being configured to:

adjust signals processed by the transmitter using the phase imbalance of the transmitter; and adjust signals processed by the receiver using the phase imbalance of the receiver.

* * * * *